Jan. 2, 1934.   LE ROY SMELKER   1,942,070
VEHICLE SEAT
Filed March 25, 1932   2 Sheets-Sheet 1
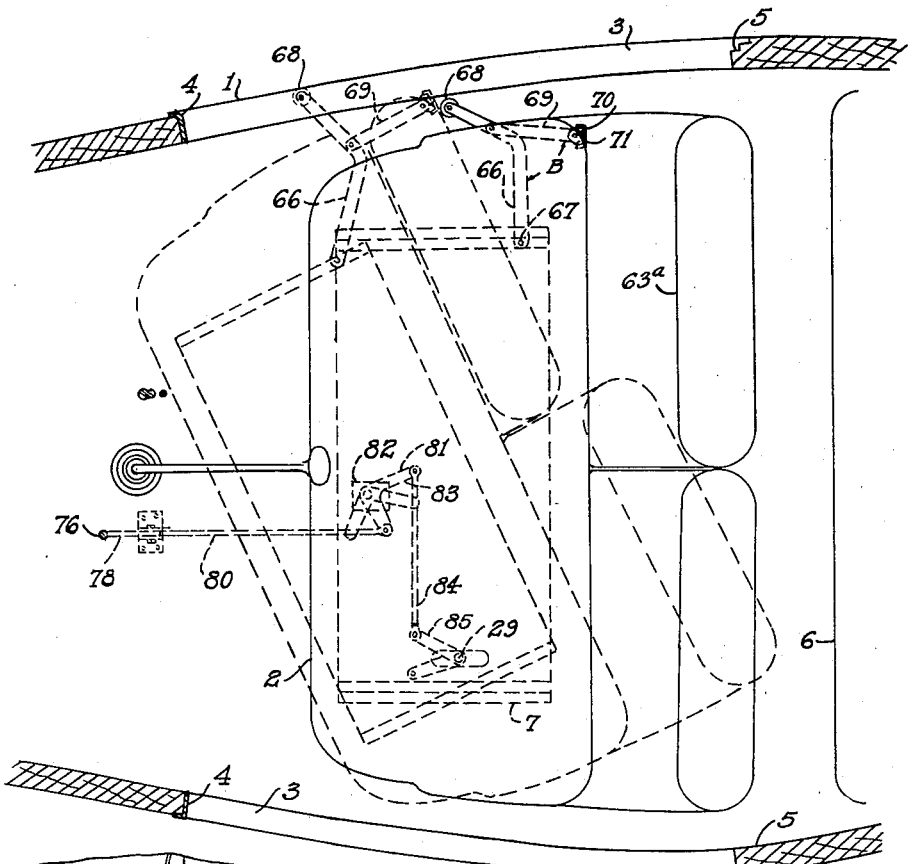
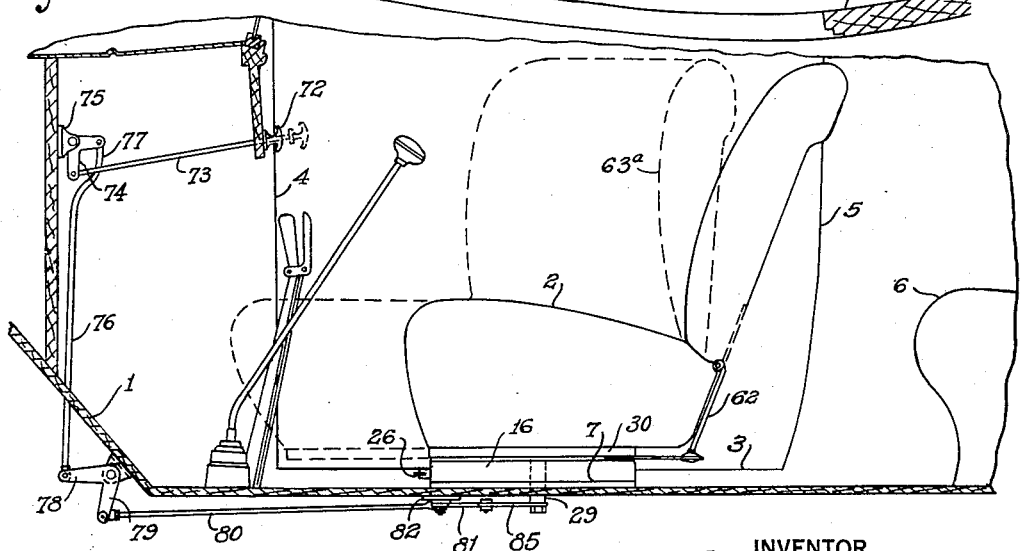

Jan. 2, 1934.  LE ROY SMELKER  1,942,070

VEHICLE SEAT

Filed March 25, 1932  2 Sheets-Sheet 2

INVENTOR
Le Roy Smelker,
BY
Howard S. Smith,
ATTORNEY

Patented Jan. 2, 1934

1,942,070

UNITED STATES PATENT OFFICE 1,942,070

VEHICLE SEAT

Le Roy Smelker, Dayton, Ohio, assignor to The Dayton Accessories Manufacturing Company, Dayton, Ohio, a corporation of Ohio Application March 25, 1932. Serial No. 601,111

9 Claims. (Cl. 155—95)

My invention relates to new and useful improvements in vehicle seats.

It is one of the principal objects of my invention to provide a rotatable front seat carrying a forwardly movable back section to increase the clearance between it and the door post of the two-door type of vehicle body to facilitate the passage of a person to and from the rear seat.

It is still another object of my invention to provide means operable from the sliding seat to force a hinged back portion of the front seat forwardly and at an accelerated rate, to permit a person the more easily to enter, and leave, the rear seat compartment.

A wide passage between the hinged back section and the door jamb is thereby effected easily, quickly and with a minimum turning movement of the seat.

It is another object of my invention to provide a divided seat back for the front seat, with pivotal means for the latter positioned directly beneath the driver so that his position relative to the controls is not altered when the seat is moved.

Another important object of my invention is the provision of a simple automatic locking means for the rotatable seat, and operable through the movement of the seat back, or through an auxiliary safety locking means to engage the right-hand car door, to prevent an unwanted rotation of the seat.

Another object of my invention is the provision of a hand-operated means to assist the rotation of the seat.

Other important objects of my invention will be set forth in the following specification and subjoined claims.

Figure 3:
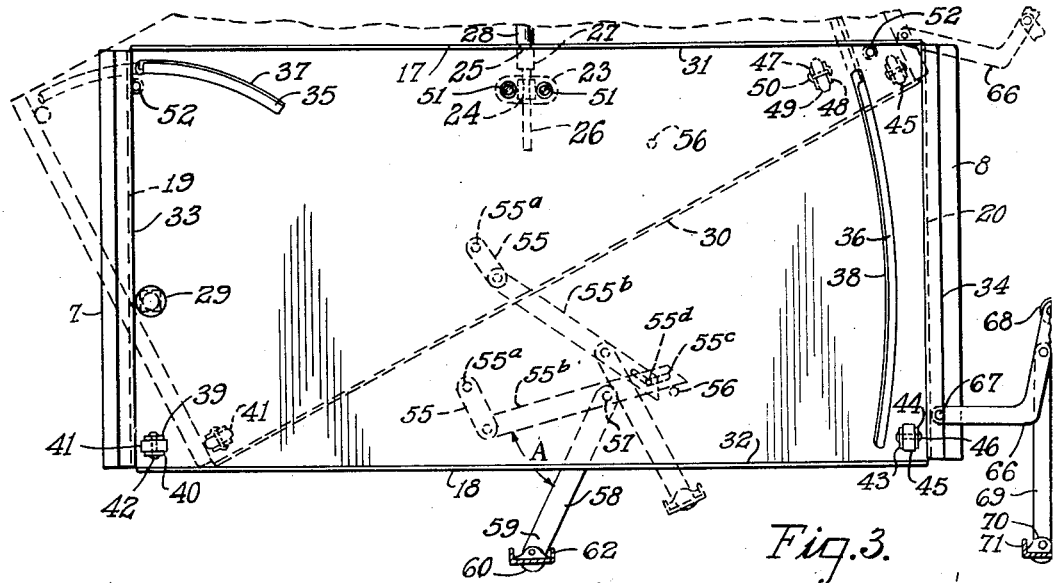
Figure 4:
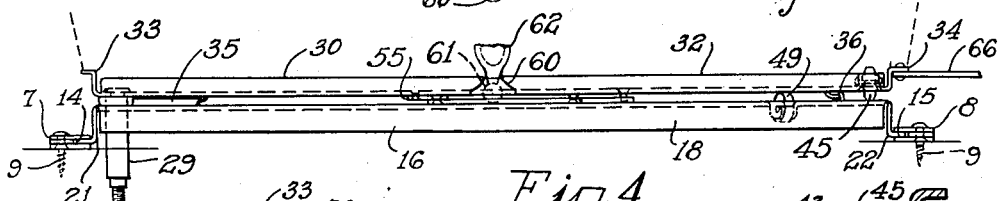
Figures 5, 6:
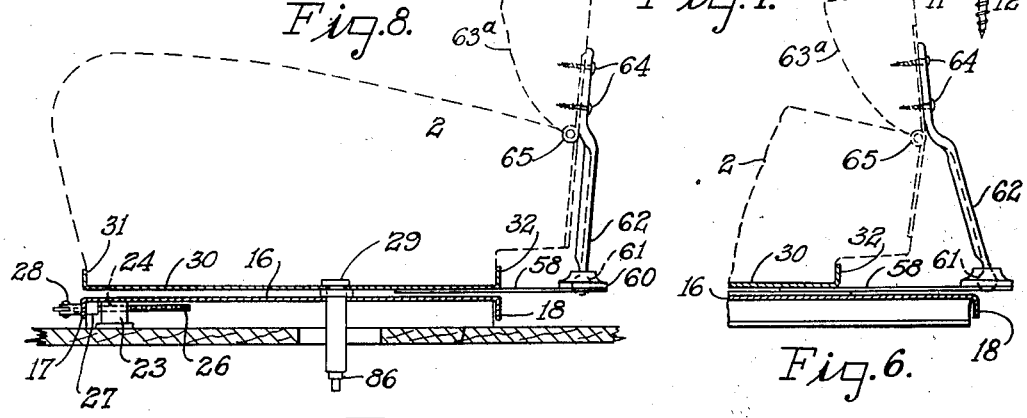

In the accompanying drawings, Figure 1 is a plan view of a two-door coach type vehicle body showing my improved seat structure in its normal and adjusted positions. Figure 2 is a longitudinal sectional view through the coach body, showing my improved seat structure. Figure 3 is a plan view of the seat-operating means. Figure 4 is a rear view of the seat structure. Figure 5 is a side view of the seat in its normal position, showing the seat cushion and back in dotted lines.

Figures 7, 8:
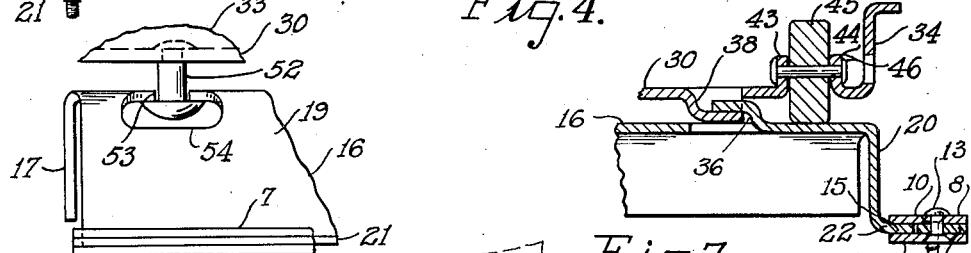

Figure 6 is a partial side view of the seat structure in its adjusted position, showing the seat cushion and forwardly inclined hinged back portion in dotted lines. Figure 7 is a detail view of the interlocking flanges and roller mounting between the upper and lower pan members. And Figures 8 is a detail view of the stop and anchor stud between the upper and lower pan members.

Referring now to the accompanying drawings for a detailed description of one form of embodiment of my invention, the numeral 1 designates a conventional vehicle body of the coach type and having on each side of a front or driver's seat 2, a door 3 hinged to a post 4 at its forward edge and adapted to engage a strike post 5 at the rear of the front seat. (See Figure 1). Positioned at the rear of the strike posts 5 and behind the front seat 2 is a fixed rear seat 6.

Secured to the car floor beneath the front seat 2 and at each side thereof, are slide rails 7 and 8 arranged in parallelism and secured to the floor by screws 9. Each of these slide rails 7 and 8 consists of a top plate 10, a bottom plate 11 of substantially the same width as the plate 10 and a center plate 12, narrower than the plates 10 and 11. These plates are secured together by rivets 13, thus forming in the rails 7 and 8 parallel grooves 14 and 15. (See Figures 1, 3, 4, 7 and 8).

Slidably mounted on the rails 7 and 8 is a member such as the inverted lower pan-shaped member 16 having formed along its front and rear edges downwardly-turned flanges 17 and 18 and along its side edges downwardly formed flanges 19 and 20 provided with outwardly formed tongues 21 and 22 that are received by the grooves 14 and 15 of the rails 7 and 8. (See Figures 3, 4, 7 and 8).

Secured to the car floor behind the front flange 17 of the member 16, at the center of the car, is a flanged block 23 provided with a threaded hole 24 parallel with the rails 7 and 8. Extending rearwardly through a hole 25 in the flange 17 and in alinement with the threaded hole 24 is a shouldered adjusting stud 26 that is received by the latter. (See Figure 5). Between the block 23 and the flange 17, the stud 26 is provided with a stop shoulder 27; and where the stud passes through the hole 25, it is of reduced diameter.

Secured to the outer reduced end of the stud 26 is a handle 28, whereby when it and the stud 26 are rotated the lower flanged member 16 may be adjusted forwardly or rearwardly as the driver may desire.

Pivoted in the pan-shaped member 16 adjacent the flange 19, is a shouldered pivot stud 29 to whose upper end a top pan-shaped member 30 is secured. This member 30 is provided with front and rear flanges 31 and 32 and side flanges 33 and 34. (See Figures 3 and 4). Within this top flanged member 30 the seat bottom 2 is fitted.

As shown at Figures 3, 4 and 7, the outside faces of the lower flanged member 16 and the top flanged member 30 are in close spaced relationship, and are so maintained by arcuate raised flanges 35 and 36 formed in the top surface of the flanged member 16 concentric with the stud 29. The flange 35 is adjacent the front flange 17 and the flange 36 is adjacent the side flange 20. These raised flanges 35 and 36 interlock with corresponding arcuate flanges 37 and 38 formed on the underside of the top flanged member 30.

Upwardly formed in the rear corner of the top flanged member 30, adjacent its flange 33, are two parallel ears 39 and 40, between which a roller 41 is mounted on a stud 42 whose axis is radial to the stud 29. (See Figure 3). Likewise formed in the opposite rear corner of the top flanged member are two parallel ears 43 and 44 between which another roller 45, similar to the roller 41 is pivoted on a roller pin 46 whose axis is radial to the stud 29.

Formed in the top surface of the lower flanged member 16 in front of the roller 45, and adjacent the front flange 17, is another pair of ears 47 and 48 between which another roller 49 is mounted on a roller pin 50 whose axis is radial to the stud 29. (See Figures 3, 4 and 7).

Now, when the top flanged member 30 is rotated respectively to the lower flanged member 16, on the stud 29, the rollers 41 and 45 will roll over the top surface of the bottom flanged member 16. The roller 49 in the bottom member will further facilitate the movement of the top member, while the coaction of these rollers with the interlocking arcuate flanges 35, 36 and 37, 38 renders its movement smooth and uniform.

The bottom surface of the top flanged member 30 and the top surface of the lower flanged member 16 are provided with holes 51, 51 that register when the seat is in its normal position, so that screws may be inserted through them to secure the flanged block 23 to the car floor. (See Figure 3).

In order to arrest the return movement of the top flanged member 30 and stop it in alinement with the lower flanged member 16, I have secured to the underface of the top member, adjacent its opposite front corners, shouldered studs 52, 52 that project downwardly and engage slots 53—53 formed in the top surface of the member 16, the heads of the studs 52—52 entering through elongated openings 54—54 in the adjacent flanges 17 and 19. (See Figures 3 and 8).

For the purpose of providing the greatest possible clearance between the strike post or rear of the door opening and the hinged portion of the front seat back, I have provided additional means for automatically moving this seat-back portion toward the front of the car.

The same mechanism affords means for holding the front seat in its normal position. This mechanism, positioned between the top and bottom members 30 and 16, consists of a short link 55 whose one end is pivotally connected to the top member near its rear edge by a swivel stud 55ᵃ. The opposite end of the link is pivotally connected to one end of a latch bar 55ᵇ.

The latch bar 55ᵇ at its end opposite the link 55 is provided with an elongated slot 55ᶜ that receives therethrough one end of a stud 55ᵈ, secured in the top surface of the bottom member 16. Where the bar 55ᵇ extends beyond the slot 55ᶜ, its end is beveled as shown in Figure 3 to increase the clearance between it and a latch pin 56, positioned near the stud 55ᵈ and projecting downwardly from the lower face of the top member 30. (See Figure 3).

Pivoted to the latch bar 55ᵇ near its center, on a stud 57, is a secondary link 58 that extends rearwardly between the members 16 and 30. The outer end 59 of this link 58, where it extends behind the member 16, is provided with a ball and socket connection 60 that receives the spherical lower end 61 of a rocker arm 62. This rocker arm is secured to the left side of the movable seat back near its left edge. (See Figure 3).

Now, when the seat is in its normal position and the hinged seat back is pushed rearwardly, the link 58 will be forced forwardly by the rocker arm 62. This forward movement of the link 58 will cause a lateral movement to the right of the latch bar 55ᵇ co-extensive the slot 55ᶜ and will bring the bar 55ᵇ in position in front of the latch pin 56. When so positioned, the seat is securely locked against any undesired forward movement.

To unlock the seat, the hinged seat back is forced forwardly; and through the rocker arm 62, the latch bar is withdrawn to the left, co-extensive the slot 55ᶜ, and the end of the latch bar is disengaged from the latch pin 56. The seat is now free to rotate forwardly to the dotted line position as shown at Figure 3.

The rocker arm 62 is preferably of channel section, with its upper offset end secured to the lower edge of the hinged back portion 63ᵃ of the seat. As shown in Figure 2, this back portion 63ᵃ is secured to the seat by hinges 65, one of which is shown. Now, since the rocker arm 62 is secured to the seat back above the hinge pin, any movement of the lower end of the rocker arm relative to the seat, will cause a corresponding opposite movement of the back at a faster rate than the forward movement of the seat.

The accelerated forward movement of the seat back is accomplished by the following means. As the seat and the top flanged member 30 are moved forwardly, they cause the stud 55ᵃ to be carried forwardly by said top member to the forward position shown at Figure 3. This forward movement of the stud causes a resultant movement of the links 55 and 55ᵇ, one end of the latter being fixed by the stud 55ᵈ. Now, since the link 58 is pivoted to the link 55ᵇ near its middle point, the angle "A" formed between the link members 55ᵇ and 58 will increase as the stud 55ᵃ is carried forwardly, and the linear distance between the latter and the connection 62 will also increase accordingly.

This increase in the distance between the stud 55ᵃ and connection 62 is further facilitated by the rocker arm connection between the seat back and the rear end of the secondary link 58, since the upper end of the rocker arm 62 is secured to the seat back 63ᵃ and must rotate about the stud 29 at right angles to the back of the seat.

There is thus obtained between the door post and the top part of the hinged seat back portion 63ᵃ, a clearance sufficient to permit the free passage of the body at or near the waist line, which is normally its widest part.

When it is desired to return the seat to its normal position, a rearward movement of the body will force the seat backward; while at the same time the body will straighten to cause the seat back controlled linkage means to engage the latch bar 55ᵇ with the pin 56 to lock the seat in its normal position.

As a further precaution against an undesired rotation of the seat, I have provided an auxiliary locking means to make the rotatable seat inoperative except when the right-hand car door is opened to receive or discharge passengers.

This mechanism comprises an L shaped link 66 whose inner end is pivoted to the rearward edge of the flange 34 of the top member 30 by a stud 67. The outer free end of the link 66 is provided with a roller 68 that is engaged by the lower inner face of the car door at its sill line when the latter is closed. (See Figures 1 and 3).

Pivoted to the link 66 near its center is a secondary link 69, similar to the link 58, that extends rearwardly below the seat. The rear end of the link 69 is provided with a ball and socket connection 70 with the lower end of a rocker arm 71, like the rocker arm 62. This rocker arm 71 is secured to the seat back 63ª near its right-hand hinge 65.

Now, as shown in Figure 1, when the car door is closed, the roller 68 will be engaged by the inner face of the car door.

When the car door is opened and the seat rotated, the seat back 63ª will move forwardly through the linkage connection 55, 55ᵇ and 58 with the lower member 16; and as previously described, the distance between the lower end of the rocker arm 71 will increase as will the angle "B" formed between the links 66 and 69, since both of the rocker arms move simultaneously with the seat back. This increase will force the outer end of the link 66 and roller 68 outwardly over the car door sill. It is thus seen, that with the door closed, the engagement of the roller 68 with the door surface would prevent rotation of the seat through the arrested outward movement of said roller. (See Figure 1).

Further assistance in rotating the car seat is provided by a linkage, operable from the instrument board and comprising a T shaped finger grip 72 on the face of this board and secured to the outer end of a rod 73 that extends through the latter to the lower end of a bell crank 74 to which it is attached. This crank 74 is pivoted in a bracket 75 secured to the front foot board of the car under the cowl. The horizontal rearwardly projecting end of the crank 74 is pivotally connected with a downwardly extending rod 76 that has an upper offset portion 77. The lower end of this rod is attached to another bell crank 78 below the floor boards of the car, and having a right angled, downwardly extending arm 79 to which another and rearwardly extending rod 80 is connected. To the rear end of this rod and below the car floor another bell crank 81 is attached and pivoted on a plate 82 secured to the car floor. (See Figures 1 and 2).

To the rearwardly extending arm 83 of this bell crank 81 a laterally extending rod 84 is attached and has secured to its opposite end the outer end of a lever arm 85. This lever arm 85 is received by a square shoulder 86 on the lower end of the pivot stud 29 that extends through the lower member 16 in which it is journalled and has secured to its upper end for rotation thereby, the top member 30.

When the latch mechanism previously described is disengaged and the car door is opened to release the auxiliary locking means, the driver or front seat passenger, by grasping the finger piece 72 and pulling it outwardly, will through its associated linkage rotate the seat forwardly; and since the movement of the finger piece 72 is rearward toward the passenger, his muscular tension and the tendency of his body to move forwardly will materially assist the rotation of the seat.

When the finger piece 72 is pushed inwardly the seat will return to its normal position and the pressure exerted will react on the seat back to again aid the return movement of the seat.

Having described my invention, I claim:

1. A vehicle seat comprising a rotative bottom, a back hinged to said bottom for a movement relative thereto, and means connected between the bottom and the hinged back whereby, when the seat bottom is rotated, the hinged back will move forwardly at a more rapid rate than the speed of rotation of the seat bottom.

2. A vehicle seat comprising a rotative bottom, a back section hinged to said bottom for a movement relative thereto, and linkage connected between the bottom and the hinged back section whereby, when the seat bottom is rotated, the hinged back section will move forwardly at a more rapid rate than the speed of rotation of the seat bottom.

3. A vehicle seat comprising a rotative bottom, a back section hinged to said bottom for a movement relative thereto, linkage pivotally secured at one end to the lower surface of said bottom, a fixed element to which the other end of said linkage is secured for a pivotal and longitudinal movement, a rocker arm secured at its upper end to the hinged back section, and a link pivotally connected between the linkage and the lower end of the rocker arm, whereby, when the seat bottom is rotated, the hinged back section will move forwardly at a more rapid rate than the speed of rotation of the seat bottom.

4. A rotative vehicle seat comprising a top flanged member secured to the bottom thereof, a bottom flanged member below said top flanged member, a pivotal connection between said top flanged member and the bottom flanged member, the top flanged member being free to turn upon the lower flanged member around said pivotal connection, a back section hinged to the top flanged member, and linkage connected between the top flanged member, the bottom flanged member and the hinged back section, whereby, when the top flanged member is rotated, the seat back section will move forwardly at a more rapid rate than the speed of rotation of said top flanged member carrying the seat.

5. A rotative vehicle seat comprising a top flanged member secured to the bottom thereof, a bottom flanged member below said top flanged member, a pivotal connection between the top flanged member and the bottom flanged member, the top flanged member being free to turn upon the bottom flanged member around said pivotal connection, a back section hinged to the top flanged member, a link pivotally secured at one end to the lower surface of the top flanged member, a second link pivotally secured at one end to the first link and formed at its other end with an elongated slot, a stud fixed to the top surface of the bottom flanged member and projecting through said slot, a rocker arm secured at its upper end to the hinged back section, and a third link pivotally connected between the second link and the lower end of the rocker arm, whereby, when the top flanged member is rotated, the hinged back section will move forwardly at a more rapid rate than the speed of rotation of said top flanged member carrying the seat.

6. A rotative vehicle seat comprising a top flanged member secured to the bottom thereof, a bottom flanged member below said top flanged member, a pivotal connection between said top flanged member and the bottom flanged member, the top flanged member being free to turn upon the lower flanged member around said pivotal connection, a back section hinged to the top flanged member, linkage connected between the top flanged member, the bottom flanged member and the hinged back section, and a stop carried by one of said flanged members for engagement with the linkage to hold the seat against a forward movement until the linkage is withdrawn from the stop by a downward movement of the hinged back.

7. A rotative vehicle seat comprising a top flanged member secured to the bottom thereof, a bottom flanged member below said top flanged member, a pivotal connection between the top flanged member and the bottom flanged member, the top flanged member being free to turn upon the lower flanged member around said pivotal connection, a back section hinged to the top flanged member, a link pivotally secured at one end to the lower surface of the top flanged member, a second link pivotally secured at one end to the first link and formed at its other end with an elongated slot, a stud fixed to the top surface of the bottom flanged member and projecting through said slot, a rocker arm secured at its upper end to the hinged back section, a third link pivotally connected between the second link and the lower end of the rocker arm, and a latch pin projecting downwardly from the top flanged member to engage the outer end of the second link when the seat is in its normal position to prevent a forward movement of the seat until the second link is withdrawn from the latch pin by a forward movement of the hinged back section.

8. In a vehicle including a hinged door, a rotative vehicle seat adjacent said door, a hinged back on said seat, and means connected between the hinged back and seat to engage the door when closed to prevent a rotative movement of the seat and a forward movement of its hinged back until the door is opened.

9. In a vehicle including a hinged door, a rotative vehicle seat adjacent said door, a hinged back on said seat, a rocker arm secured to said back, an L-shaped link pivoted at its inner end to the seat, a second link pivotally connected at its outer end to the middle portion of the first link and at its rear end to the rocker arm, and a roller on the outer end of the first link for engagement with the closed door to prevent a rotative movement of the seat and a forward movement of its hinged back until the door is opened.

LE ROY SMELKER.